US012799028B2

(12) United States Patent
Okazaki et al.

(10) Patent No.: US 12,799,028 B2
(45) Date of Patent: Nov. 17, 2026

(54) METHOD FOR MANUFACTURING OPTICAL FIBER AND METHOD FOR MANUFACTURING OPTICAL CABLE

(71) Applicant: SUMITOMO ELECTRIC INDUSTRIES, LTD., Osaka (JP)

(72) Inventors: Iwao Okazaki, Osaka (JP); Kazuyuki Sohma, Osaka (JP); Takahiro Nomura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 196 days.

(21) Appl. No.: 18/835,079

(22) PCT Filed: Feb. 14, 2024

(86) PCT No.: PCT/JP2024/005022

§ 371 (c)(1),
(2) Date: Aug. 1, 2024

(87) PCT Pub. No.: WO2024/172072

PCT Pub. Date: Aug. 22, 2024

(65) Prior Publication Data

US 2026/0193131 A1 Jul. 9, 2026

(30) Foreign Application Priority Data

Feb. 16, 2023 (JP) ................................ 2023-022232
Aug. 31, 2023 (JP) ................................ 2023-141381

(51) Int. Cl.
*C03C 25/1065* (2018.01)
*G02B 6/02* (2006.01)
(Continued)

(52) U.S. Cl.
CPC ...... *C03C 25/1065* (2013.01); *G02B 6/02395* (2013.01); *G02B 6/03694* (2013.01); *G02B 6/4479* (2013.01)

(58) Field of Classification Search
CPC ........... C03C 25/1065; G02B 6/02395; G02B 6/03694; G02B 6/4479; G02B 6/02; G02B 6/036
See application file for complete search history.

(56) References Cited

U.S. PATENT DOCUMENTS 4,000,936 A * 1/1977 Gloge .................. G02B 6/4429 385/124
10,451,796 B2 * 10/2019 Enomoto ........... G02B 6/02395
(Continued)

FOREIGN PATENT DOCUMENTS

JP 2006-065006 A 3/2006
JP 2014-125405 A 7/2014
(Continued)

OTHER PUBLICATIONS

F. Cocchini, "The Lateral Rigidity of Double-Coated Optical Fibers", Journal of Lightwave Technology, pp. 1706-1710, vol. 13, No. 8, Aug. 1995.
(Continued)

*Primary Examiner* — John Bedtelyon
(74) *Attorney, Agent, or Firm* — McDonald Hopkins LLC

(57) ABSTRACT

Provided is a method for manufacturing an optical fiber that includes a glass fiber, a primary resin layer, and a secondary resin layer. When a lateral rigidity of the optical fiber as shown in Formula (1) is set as D [N/m$^2$], and a bending rigidity of the optical fiber as shown in Formula (2) is set as H [N·m$^2$] with respect to the optical fiber, Formula (3) is satisfied.
(Continued)

$$D = \left\{ \frac{c1}{\left(1 - \frac{R0}{R2}\right)^{c2}} + c3 \right\} \left\{ (E2 - E1) 10^{\sum_{i,j,k} c_{ijk} \left(\log_{10} \frac{R2-R1}{R2-R0}\right)^i \left(\log_{10} \frac{E1}{E2}\right)^j \left(\log_{10} \frac{R0}{R2}\right)^k} + E1 \right\} \quad (1)$$

$$H \propto \pi R0^4 E0 + \pi \left(R2^4 - R1^4\right) E2 \quad (2)$$

$$0.3 \geq \frac{D / H^2}{D0 / H0^2} (\alpha 2 - \alpha 1) + \alpha 1 \quad (3)$$

10 Claims, 2 Drawing Sheets

(51) Int. Cl.

*G02B 6/036* (2006.01)
*G02B 6/44* (2006.01)

(56) References Cited

U.S. PATENT DOCUMENTS

2019/0146150 A1 5/2019 Konstadinidis et al.
2019/0187366 A1 6/2019 Enomoto et al.
2022/0011505 A1 1/2022 Maruyama
2023/0137341 A1 5/2023 Saomoto et al.
2024/0004126 A1 1/2024 Mukasa

FOREIGN PATENT DOCUMENTS

JP 2019-112293 A 7/2019
JP 2022-153101 A 10/2022
WO 2018/025896 A1 2/2018
WO 2021/090912 A1 5/2021
WO 2021/187466 A1 9/2021
WO 2026/058914 A1 3/2026

OTHER PUBLICATIONS

Specification of U.S. Appl. No. 18/834,288, filed Jul. 30, 2024.
US Office Action issued in U.S. Appl. No. 18/834,288 dated Jun. 16, 2026.
R. D. Morgan et al., "Determination of Monomode Fiber Buffer Properties", Journal of Lightwave Technology, Aug. 1, 1994, vol. 12, No. 8, p. 1355-p. 1359, XP000484309.
Marie Wandel et al., "Fiber designs for high figure of merit and high slope dispersion compensating fibers", Journal of Optical and Fiber Communications Reports, Dec. 23, 2005, p. 25-p. 60, XP019388183.

* cited by examiner

METHOD FOR MANUFACTURING OPTICAL FIBER AND METHOD FOR MANUFACTURING OPTICAL CABLE

TECHNICAL FIELD

The present disclosure relates to a method for manufacturing an optical fiber and a method for manufacturing an optical cable.

This application claims priority based on Japanese Patent Application No. 2023-022232 filed on Feb. 16, 2023, and Japanese Patent Application No. 2023-141381 filed on Aug. 31, 2023, the contents of which are incorporated herein by reference.

BACKGROUND ART

Due to an increase in communication traffic, it is important to increase the number of optical fibers per unit cross-sectional area for high density in optical cables. It is necessary to reduce the diameter of the optical fibers for high density in the optical cables.

Patent Literature 1 discloses an optical fiber in which an outer diameter of a cladding portion is from 70 μm to 120 μm.

CITATION LIST

Patent Literature

Patent Literature 1: Japanese Unexamined Patent Publication No. 2022-153101

Patent Literature 2: International Publication WO 2018/025896

Non Patent Literature

Non Patent Literature 1: F. Cocchini, "The Lateral Rigidity of Double-Coated Optical Fibers", JOURNAL OF LIGHTWAVE TECHNOLOGY, VOL. 13, NO. 8, AUGUST 1995

SUMMARY OF INVENTION

A method for manufacturing an optical fiber according to the present disclosure is a method for manufacturing an optical fiber that includes a glass fiber with a diameter of 125 μm or less, a primary resin layer that surrounds the glass fiber, and a secondary resin layer that surrounds the primary resin layer and has a diameter of from 150 μm to 210 μm, and is used in an optical cable. The method includes: a process of obtaining a lateral rigidity D0, a bending rigidity H0, a transmission loss α1 at a wavelength of 1.55 μm before being mounted in the optical cable, and a transmission loss α2 at a wavelength of 1.55 μm after being mounted in the optical cable with respect to a reference optical fiber; and a process of setting a range of Dg satisfying Formula (3) at 125 μm or less when a diameter of the glass fiber is set as Dg [μm], a radius of the glass fiber is set as R0 [m], a Young's modulus of the glass fiber is set as E0 [N/m$^2$], a radius of the primary resin layer is set as R1 [m], a Young's modulus of the primary resin layer is set as E1 [N/m$^2$], a radius of the secondary resin layer is set as R2 [m], a Young's modulus of the secondary resin layer is set as E2 [N/m$^2$], a lateral rigidity of the optical fiber as shown in Formula (1) is set as D [N/m$^2$], and a bending rigidity of the optical fiber as shown in Formula (2) is set as H [N·m$^2$] with respect to the optical fiber.

[Equation 1]

$$D=\left\{\frac{c1}{\left(1-\frac{R0}{R2}\right)^{c2}}+c3\right\}\left\{(E2-E1)10^{\sum_{i,j,k}c_{ijk}\left(\log_{10}\frac{R2-R1}{R2-R0}\right)^{i}\left(\log_{10}\frac{E1}{E2}\right)^{j}\left(\log_{10}\frac{R0}{R2}\right)^{k}}+E1\right\} \tag{1}$$

$$H\propto \pi R0^4E0+\pi\left(R2^4-R1^4\right)E2 \tag{2}$$

$$0.3\geq\frac{D/H^2}{D0/H0^2}(\alpha 2-\alpha 1)+\alpha 1 \tag{3}$$

In Formula (1), c1 is 0.209367, c2 is 1.206659, c3 is 0.401169, and $c_{ijk}$ is as follows.

$$c_{000}=-0.611554$$
$$c_{100}=3.615414$$
$$c_{010}=0.253128$$
$$c_{001}=-7.130445$$
$$c_{200}=0.787599$$
$$c_{110}=0.329243$$
$$c_{101}=2.320080$$
$$c_{020}=-0.062024$$
$$c_{011}=-0.985974$$
$$c_{002}=-8.696048$$

DESCRIPTION OF EMBODIMENTS

Figure 1:
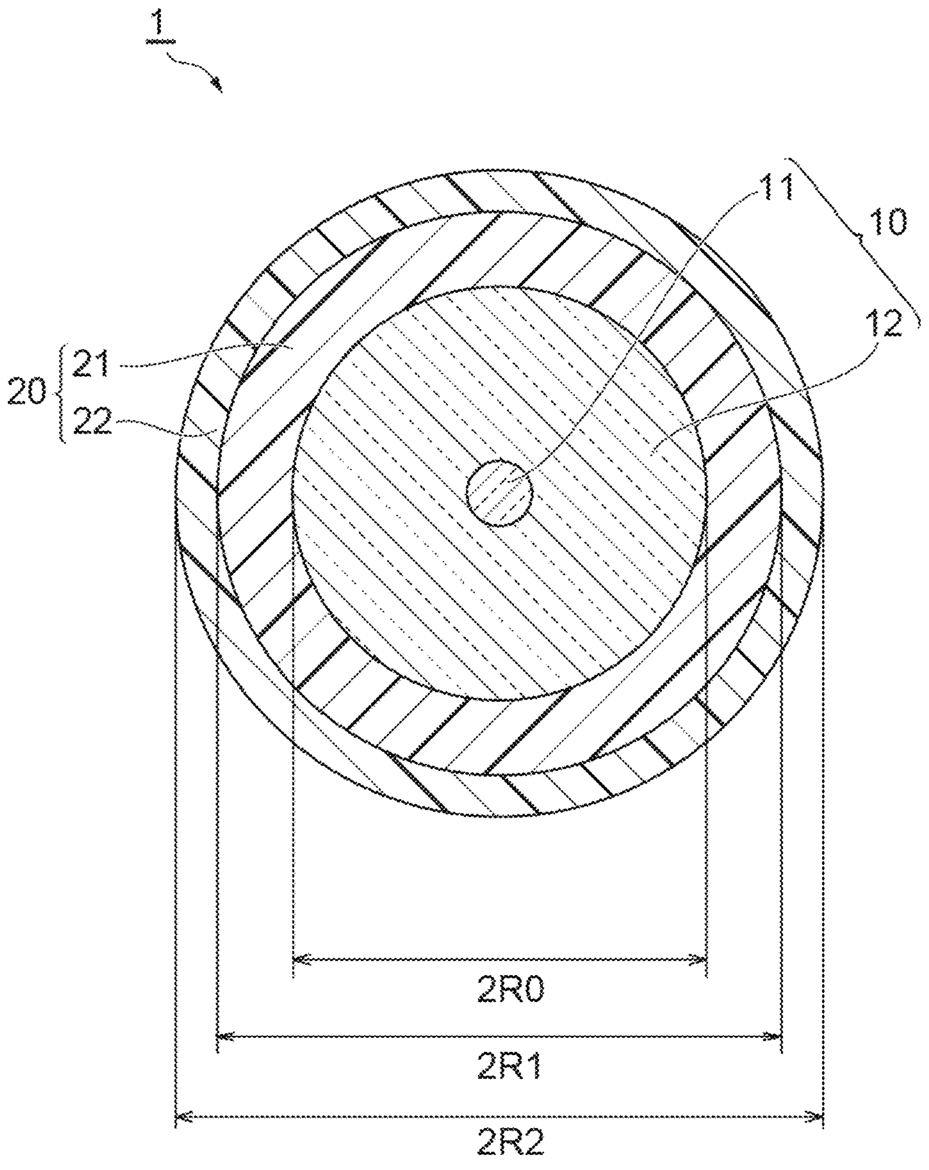
FIG. 1 is a cross-sectional view orthogonal to a fiber axis of an optical fiber manufactured by a method for manufacturing an optical fiber according to an embodiment.

Problems to be Solved by Present Disclosure

However, when reducing the diameter of the optical fiber, a micro-bending loss that occurs when the optical fiber is cabled increases.

An object of the present disclosure is to provide a method for manufacturing an optical fiber and a method for manufacturing an optical cable which are capable of suppressing a micro-bending loss even in a high density.

Effects of Present Disclosure

According to the present disclosure, it is possible to provide a method for manufacturing an optical fiber and a method for manufacturing an optical cable which are capable of suppressing an increase in a micro-bending loss even in a high density.

DESCRIPTION OF EMBODIMENT OF PRESENT DISCLOSURE

First, embodiments of the present disclosure will be listed and described.

(1) A method for manufacturing an optical fiber according to an aspect of the present disclosure is a method for manufacturing an optical fiber that includes a glass fiber with a diameter of 125 μm or less, a primary resin layer that surrounds the glass fiber, and a secondary resin layer that surrounds the primary resin layer and has a diameter of from 150 μm to 210 μm, and is used in an optical cable. The method includes: a process of obtaining a lateral rigidity D0, a bending rigidity H0, a transmission loss α1 at a wavelength of 1.55 μm before being mounted in the optical cable, and a transmission loss α2 at a wavelength of 1.55 μm after being mounted in the optical cable with respect to a reference optical fiber; and a process of setting a range of Dg satisfying Formula (3) at 125 μm or less when a diameter of the glass fiber is set as Dg [μm], a radius of the glass fiber is set as R0 [m], a Young's modulus of the glass fiber is set as E0 [N/m$^2$], a radius of the primary resin layer is set as R1 [m], a Young's modulus of the primary resin layer is set as E1 [N/m$^2$], a radius of the secondary resin layer is set as R2 [m], a Young's modulus of the secondary resin layer is set as E2 [N/m$^2$], a lateral rigidity of the optical fiber as shown in Formula (1) is set as D [N/m$^2$], and a bending rigidity of the optical fiber as shown in Formula (2) is set as H [N·m$^2$] with respect to the optical fiber.

[Equation 2]

$$D = \left\{ \frac{c1}{\left(1 - \frac{R0}{R2}\right)^{c2}} + c3 \right\} \left\{ (E2 - E1) 10^{\sum_{i,j,k} c_{ijk} \left(\log_{10} \frac{R2-R1}{R2-R0}\right)^i \left(\log_{10} \frac{E1}{E2}\right)^j \left(\log_{10} \frac{R0}{R2}\right)^k} + E1 \right\} \tag{1}$$

$$H \propto \pi R0^4 E0 + \pi\left(R2^4 - R1^4\right) E2 \tag{2}$$

$$0.3 \geq \frac{D/H^2}{D0/H0^2}(\alpha 2 - \alpha 1) + \alpha 1 \tag{3}$$

In Formula (1), c1 is 0.209367, c2 is 1.206659, c3 is 0.401169, and $c_{ijk}$ is as follows.

$$c_{000} = -0.611554$$
$$c_{100} = 3.615414$$
$$c_{010} = 0.253128$$
$$c_{001} = -7.130445$$
$$c_{200} = 0.787599$$
$$c_{110} = 0.329243$$
$$c_{101} = 2.320080$$
$$c_{020} = -0.062024$$
$$c_{011} = -0.985974$$
$$c_{002} = -8.696048$$

In the optical fiber, the range of Dg at which the lateral rigidity D and the bending rigidity H of the optical fiber satisfy Formula (3) is set. Accordingly, when the diameter of the glass fiber is set within the range of Dg, it is possible to manufacture an optical fiber capable of suppressing an increase in a micro-bending loss even in a high density. Due to a reduction in a diameter of the optical fiber, the number of optical fibers mounted in the optical cable can be increased. Even in an optical cable having the same diameter as in an optical cable in the related art, more optical fibers can be included and a larger amount of information can be transmitted. In addition, a less material is used as compared with a conventional optical cable with the same number of cores, and economic efficiency is excellent.

(2) According to (1), in the setting process, the range of Dg satisfying Formula (3) and Formula (4) may be set.

[Equation 3]

$$0.18 \leq \frac{D/H^2}{D0/H0^2}(\alpha 2 - \alpha 1) + \alpha 1 \tag{4}$$

In this case, it is possible to obtain an optical fiber having a micro-bending loss small enough for practical use.

(3) According to (1) or (2), a diameter of the glass fiber may be less than 125 μm, and in the setting process, the range of Dg satisfying Formula (3) at less than 125 μm may be set.

(4) According to (1) or (2), a diameter of the glass fiber may be 120 μm or less, and in the setting process, the range of Dg satisfying Formula (3) at 120 μm or less may be set.

(5) According to any one of (1) to (4), the Young's modulus of the glass fiber may be from 70 GPa to 80 GPa.

(6) A method for manufacturing an optical cable according to another aspect of the present disclosure includes manufacturing an optical cable including a plurality of the optical fibers according to any one of (1) to (5). In this case, since the optical cable includes the optical fiber, it is possible to manufacture an optical cable capable of suppressing an increase in the micro-bending loss even in a high density.

(7) According to (6), the optical cable may further include a coat, a diameter of the coat may be 3.8 mm or less, and all of the optical fibers may be surrounded by the coat. In this case, it is possible to manufacture an optical cable with a small diameter.

(8) According to (7), a core density obtained by dividing the number of the optical fibers included in the optical cable by a cross-sectional area calculated from the diameter of the coat may be set to 4.4 pieces/mm$^2$ or more. In this case, it is possible to manufacture an optical cable with a high density. It is possible to manufacture a cable through which optical signals with a sufficient amount of information can propagate even in a small diameter.

(9) According to any one of (6) to (8), the number of the optical fibers included in the optical cable may be set to 50 or more. In this case, it is possible to manufacture an optical cable with a high density.

Details of Embodiment of Present Disclosure

Specific examples of the method for manufacturing an optical fiber and the method for manufacturing an optical cable according to the present embodiment will be described with reference to the accompanying drawings as necessary. Note that the present disclosure is not limited to this exemplification, and is intended to include all modifications within the meaning and the scope equivalent to the appended claims. In description of the drawings, the same reference numeral will be given to the same element, and redundant description thereof will be omitted.

FIG. 1 is a cross-sectional view orthogonal to a fiber axis of an optical fiber that is manufactured by the method for manufacturing an optical fiber according to the embodiment. As illustrated in FIG. 1, an optical fiber 1 includes a glass fiber 10 and a coating resin 20. Optical fiber 1 is used in an optical cable.

Glass fiber 10 includes quartz glass. Glass fiber 10 includes a core 11 and a cladding 12. Core 11 extends along a fiber axis of optical fiber 1. A diameter (core diameter) of core 11 is, for example, from 9 μm to 14 μm. A refractive index of core 11 is higher than a refractive index of cladding 12. A specific refractive index difference of core 11 with respect to cladding 12 is, for example, from 0.3% to 0.5%. In this embodiment, a micro-bending loss is suppressed, and thus the specific refractive index difference of core 11 can be reduced. Core 11 consists of, for example, germanium-added quartz glass or pure quartz glass. Here, the pure quartz glass is quartz glass that does not substantially contain impurities.

Cladding 12 surrounds core 11 and covers an outer peripheral surface of core 11. Cladding 12 consists of pure quartz glass or a fluorine-added quartz glass. A diameter (cladding diameter) of cladding 12 is a diameter (glass diameter) of glass fiber 10. The glass diameter is, for example, from 75 μm to 125 μm. The glass diameter may be, for example, 75 μm or more and less than 125 μm. The glass diameter may be from 75 μm to 120 μm. A Young's modulus of glass fiber 10 is, for example, from 70 GPa to 80 GPa. A trench may be provided in cladding 12. According to the trench, it is possible to further suppress the micro-bending loss.

Coating resin 20 is constituted by an ultraviolet curable resin. Coating resin 20 includes a primary resin layer 21 and a secondary resin layer 22. Primary resin layer 21 surrounds glass fiber 10 (cladding 12) and covers an outer peripheral surface of glass fiber 10. Primary resin layer 21 is provided in contact with glass fiber 10. The thickness of primary resin layer 21 is, for example, from 2 μm to 20 μm.

A Young's modulus of primary resin layer 21 is, for example, from 0.05 MPa to 0.7 MPa. In order to suppress the micro-bending loss, it is preferable that the Young's modulus of primary resin layer 21 is low. When the Young's modulus of primary resin layer 21 exceeds 0.8 MPa, it cannot sufficiently suppress the micro-bending loss. When the Young's modulus of primary resin layer 21 is excessively low, there is a possibility that coating resin 20 may be broken. When the Young's modulus of primary resin layer 21 is 0.05 MPa or more, breakage of coating resin 20 is suppressed.

For example, a polyether-based or polyester-based urethane acrylate is used for primary resin layer 21. Primary resin layer 21 may contain a reactive diluent monomer and a photoinitiator as necessary. The Young's modulus of primary resin layer 21 is adjusted by, for example, a molecular weight of a polyether portion of the ultraviolet curable resin and the kind of the diluted monomer.

For example, primary resin layer 21 contains from 0.3 mass % to 2.0 mass % of phosphorous-containing photoinitiator. For example, primary resin layer 21 contains polypropylene glycol having a mass-average molecular weight is from 1000 to 5000. According to this, in optical fiber 1 including primary resin layer 21 with a relatively low Young's modulus, even when an external force is applied to optical fiber 1 during rewinding, a unitization process, or the like, peeling of an interface between glass fiber 10 and primary resin layer 21 or breakage of the resin coating is less likely to occur.

Secondary resin layer 22 surrounds primary resin layer 21 and covers an outer peripheral surface of primary resin layer 21. A diameter of secondary resin layer 22 is, for example, from 150 μm to 210 μm, and may be 150 μm or more and less than 180 μm or from 150 μm to 165 μm. The diameter of secondary resin layer 22 is a diameter (coating diameter) of coating resin 20. The thickness of secondary resin layer 22 is, for example, 5 μm or more. The Young's modulus of secondary resin layer 22 is, for example, from 1000 MPa to 3000 MPa.

For example, a polyether-based or polyester-based urethane acrylate is used for secondary resin layer 22. Secondary resin layer 22 may contain a reactive diluent monomer and a photoinitiator as necessary. The Young's modulus of secondary resin layer 22 is adjusted by, for example, a molecular weight of a polyether portion of the ultraviolet curable resin and the kind of the diluted monomer. Optical fiber 1 is preferably colored for identification. Secondary resin layer 22 may be colored by containing a pigment or a dye, or a colored layer having a thickness of several μm may be provided on secondary resin layer 22.

An optical cable that is manufactured by the method for manufacturing an optical cable according to this embodiment is manufactured by using optical fiber 1. The optical cable includes a plurality of optical fibers 1, and a coat that surrounds plurality of optical fibers 1. A diameter of the coat is, for example, 3.8 mm or less. A core density obtained by dividing the number of optical fibers 1 mounted in the optical cable by a cross-sectional area calculated from the diameter of the coat is, for example, 4.4 pieces/mm$^2$ or more. The number of optical fibers 1 mounted in the optical cable is, for example, 50 pieces or more, or 96 pieces or more. An example of the optical cable of this embodiment is shown in Table 1. A transmission loss at a wavelength of 1.55 μm of optical fibers included in each cable was from 0.23 dB/km to 0.25 dB/km in any fiber. In the optical cable, plurality of optical fibers 1 may be accommodated in the coat, and the optical cable may be referred to as an optical cord.

TABLE 1

| | | | |
|---|---|---|---|
| Outer diameter of cable (mm) | 3 | 3.5 | 3.8 |
| Number of cores (pieces) | 96 | 96 | 50 |
| Cross-sectional area (mm$^2$) | 7.1 | 9.6 | 11.3 |
| Core density (pieces/mm$^2$) | 13.6 | 10.0 | 4.4 |
| Diameter of glass fiber (μm) | 100 | 100 | 100 |
| Diameter of optical fiber (μm) | 165 | 165 | 165 |

Non Patent Literature 1 discloses that micro-bending resistance characteristics in the optical fiber are correlated with a lateral rigidity D and a bending rigidity H of the optical fiber and can be obtained by an approximate expression. Patent Literature 2 discloses that the approximate expression in Non Patent Literature 1 is expanded to a form closer to an actual situation. The approximate expression in Patent Literature 2 is calculated by numerical analysis with a glass diameter limited to 125 μm. Therefore, when being applied to an optical fiber having a different glass diameter, a deviation between a calculated value of the micro-bending loss and an actually measured value may increase. Particularly, in an optical fiber having a small diameter, the micro-bending loss calculated by the approximate expression in Patent Literature 2 becomes lower than an actual loss.

Hereinafter, description will be given of an approximate expression that is expanded to a range of the glass diameter less than 125 μm or a range of a coating diameter less than 160 μm.

When a radius of the glass fiber is set as R0 [m], the Young's modulus of the glass fiber is set as E0 [N/m$^2$], a radius of the primary resin layer is set as R1 [m], the Young's modulus of the primary resin layer is set as E1 [N/m$^2$], a radius of the secondary resin layer is set as R2 [m], and the Young's modulus of the secondary resin layer is set as E2 [N/m$^2$], the lateral rigidity D of the optical fiber is expressed by Formula (1), and the bending rigidity H is expressed by Formula (2).

[Equation 4]

$$D = \left\{ \frac{c1}{\left(1 - \frac{R0}{R2}\right)^{c2}} + c3 \right\} \left\{ (E2 - E1) 10^{\sum_{i,j,k} c_{ijk} \left(\log_{10} \frac{R2-R1}{R2-R0}\right)^i \left(\log_{10} \frac{E1}{E2}\right)^j \left(\log_{10} \frac{R0}{R2}\right)^k} + E1 \right\} \quad (1)$$

$$H \propto \pi R0^4 E0 + \pi\left(R2^4 - R1^4\right) E2 \quad (2)$$

In Formula (1), c1 is 0.209367, c2 is 1.206659, c3 is 0.401169, and $c_{ijk}$ is as follows.

$$c_{000} = -0.611554$$
$$c_{100} = 3.615414$$
$$c_{010} = 0.253128$$
$$c_{001} = -7.130445$$
$$c_{200} = 0.787599$$
$$c_{110} = 0.329243$$
$$c_{101} = 2.320080$$
$$c_{020} = -0.062024$$
$$c_{011} = -0.985974$$
$$c_{002} = -8.696048$$

A derivation method of Formula (1) will be described below.

In general, a micro-bending loss β of the optical fiber is expressed by an approximate expression in Formula (5) by using the lateral rigidity D, the bending rigidity H, and a constant A derived from optical characteristics of the optical fiber.

[Equation 5]

$$\beta \sim A \times \left(\frac{D}{H^2}\right) \quad (5)$$

As can be seen from Formula (5), the micro-bending loss β is approximately proportional to D/H$^2$. That is, D/H$^2$ is sensitivity indicating how much the transmission loss increases due to a force that is applied from a lateral side.

Based on the method in Non Patent Literature 1, a two-dimensional FEM (finite element method) was performed by using analysis software MSC. Nastran 2020 sp1 for 378 kinds of combinations in which a cladding diameter (2R0) is from 75 μm to 130 μm, a primary diameter (2R1) is from 0 μm to 210 μm, a secondary diameter (2R2) is from 110 μm to 210 μm, the Young's modulus E1 of the primary resin layer is from 0.05 MPa to 0.7 MPa, and the Young's modulus E2 of the secondary resin layer is from 1000 MPa to 3000 MPa.

Next, each lateral rigidity D was calculated from analysis results on the basis of the following Expression.

$$D = 2F\theta R2 / uy^*$$

Here, F represents a lateral pressure (1 MPa), θ represents a stress application angle (from 0° to 9°), and uy* represents a displacement amount of a pressurizing portion in each structure.

Furthermore, from the results of the lateral rigidity D obtained from each structure, the following analysis expression in which R0, R1, R2, E0, E1, and E2 are set as explanatory variables. c1, c2, c3, and $c_{ijk}$ are as described above.

[Equation 6]

$$\log_{10} \frac{D - D1}{D2 - D1} \sim \sum_{i,j,k} c_{ijk} \left(\log_{10} \frac{R2 - R1}{R2 - R0}\right)^i \left(\log_{10} \frac{E1}{E2}\right)^j \left(\log_{10} \frac{R0}{R2}\right)^k \quad (6)$$

[Equation 7]

$$\text{However, } \frac{D1}{E1} = \frac{D2}{E2} = \frac{c1}{\left(1 \frac{R0}{R2}\right)^{c2}} + c3. \quad (7)$$

Formula (1) was obtained by rearranging Formula (6) and Formula (7).

The present inventors used Formula (1) and Formula (2), and derived an analysis expression of predicting the transmission loss α including the micro-bending loss β occurring when an optical fiber having a glass diameter of 125 μm or less is cabled. In the analysis expression, the transmission loss α at a wavelength of 1.55 μm of an optical fiber that is a prediction target is estimated from comparison with an optical fiber of which the lateral rigidity, the bending rigidity, the transmission loss at a wavelength of 1.55 μm before being mounted in the optical cable, and the transmission loss at a wavelength of 1.55 μm after being mounted in the optical cable are known. A case where the lateral rigidity and the bending rigidity are known includes a case where a radius (or a diameter), and a Young's modulus are respectively known for the glass fiber, the primary resin layer, and the secondary resin layer, and the lateral rigidity and the bending rigidity can be calculated from Formula (1) and Formula (2).

When the lateral rigidity is set as D0, the bending rigidity is set as H0, the transmission loss at a wavelength of 1.55 μm before being mounted in the optical cable is set as α1, and the transmission loss at a wavelength of 1.55 μm when being mounted in the optical cable is set as α2 with respect to the reference optical fiber, the analysis expression is expressed as follows.

[Equation 8]

$$\alpha = \frac{D/H^2}{D0/H0^2}(\alpha 2 - \alpha 1) + \alpha 1 \quad (8)$$

Figure 2:
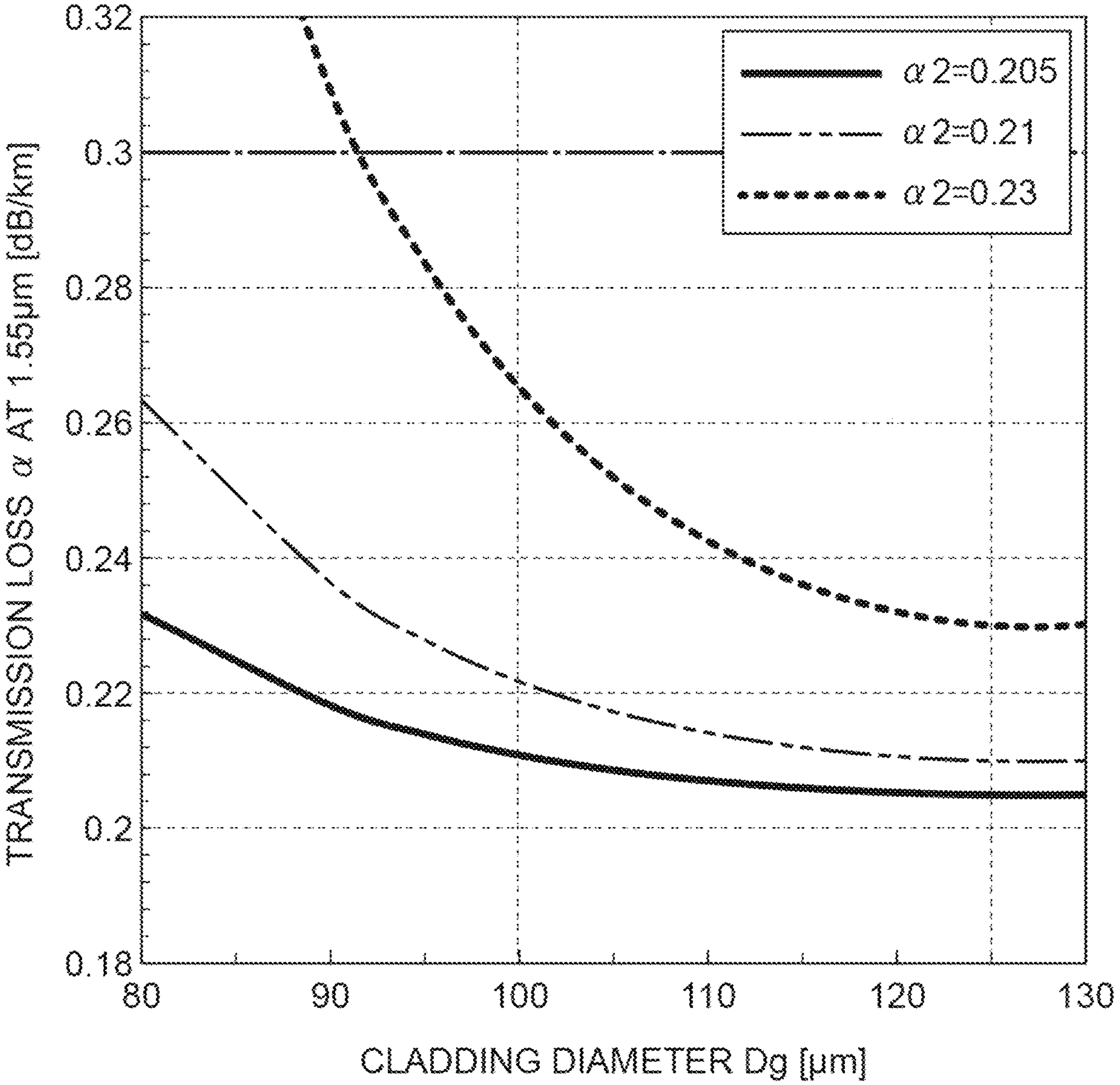
FIG. 2 is a graph illustrating a relationship between a cladding diameter and a transmission loss.

FIG. 2 is a graph illustrating a relationship between a cladding diameter and a transmission loss. In FIG. 2, the horizontal axis represents a cladding diameter Dg of the optical fiber that is a prediction target, and the vertical axis represents a transmission loss α at a wavelength of 1.55 μm. As an example, FIG. 2 is a graph of an analysis expression using an optical fiber in which a diameter of the glass fiber is 125 μm, a diameter of the primary resin layer is 135 μm, a diameter of the secondary resin layer is 155 μm, the Young's modulus of the glass fiber is 72500 MPa, the Young's modulus of the primary resin layer is 0.4 MPa, and the Young's modulus of the secondary resin layer is 1500 MPa as a reference optical fiber as an example.

In the optical fiber of the present disclosure, the cladding diameter (2R0) is from 75 μm to 125 μm, the primary diameter (2R1) is from 79 μm to 164 μm, and the secondary diameter (2R2) is from 89 μm to 210 μm.

FIG. 2 shows cases where the transmission loss α2 of the reference optical fiber after being cabled is 0.205 dB/km, 0.21 dB/km, and 0.23 dB/km, respectively. As illustrated in FIG. 2, as α2 increases, the transmission loss α of the optical fiber that is a prediction target increases. α1 that is a transmission loss of the reference optical fiber before being cabled is, for example, an average value of transmission losses of the reference optical fiber wound around a bobbin of 50 km winding. α1 may be an average value of transmission losses measured at a plurality of different points in a longitudinal direction of the reference optical fiber. In this example, al was 0.2 dB/km.

In order to suppress an increase in the micro-bending loss, it is necessary that the transmission loss α is set to 0.3 dB/km equivalent to that of currently mainstream optical cables using optical fibers with an outer diameter of 250 μm. That is, according to optical fiber 1 in which Dg is set to a range satisfying the following Formula (3), the increase in the micro-bending loss is suppressed.

[Equation 9]

$$0.3 \geq \frac{D/H^2}{D0/H0^2}(\alpha 2 - \alpha 1) + \alpha 1 \quad (3)$$

An explanation will be given of FIG. 2. In a case where α2 is 0.23, it is necessary for the cladding diameter to be 93 μm or more in order to suppress the transmission loss α at a wavelength of 1.55 μm to 0.3 dB/km or less. The transmission loss (α2) of the optical fiber is changed by changing the Young's modulus after curing of a resin that is used in the coating layer (the primary resin layer and the secondary resin layer) of the optical fiber and the thickness of each layer. As a result, predetermined curves as shown in FIG. 2 are obtained. From the curves, it is possible to predict that an optical fiber with how small diameter can be obtained while realizing a desired transmission loss, and it is possible to manufacture the optical fiber.

A lower limit value of the transmission loss α is, for example, 0.18 dB/km. That is, Dg is set to satisfy the following Formula (4) in addition to Formula (3).

[Equation 10]

$$0.18 \leq \frac{D/H^2}{D0/H0^2}(\alpha 2 - \alpha 1) + \alpha 1 \quad (4)$$

Description will be given of the method for manufacturing an optical fiber and the method for manufacturing an optical cable according to this embodiment. The method for manufacturing an optical fiber is a method for manufacturing optical fiber 1, and includes a process of obtaining the lateral rigidity D0, the bending rigidity H0, the transmission loss α1, and the transmission loss α2 with respect to a reference optical fiber. The lateral rigidity D0 is obtained from the following Formula (1). The bending rigidity H0 is obtained by the following Formula (2). The transmission loss α1 and the transmission loss α2 are obtained by actual measurement.

The method for manufacturing an optical fiber further includes a process of setting a range of the cladding diameter Dg of glass fiber 10 to satisfy the following Formula (3) at 125 μm or less with respect to optical fiber 1. In this process, a range of the cladding diameter Dg satisfying the following Formulae (3) and (4) may be set. According to optical fiber 1 manufactured by setting the cladding diameter Dg to the ranges, even when the optical cable is made highly dense, an increase in the micro-bending loss can be suppressed.

The method for manufacturing an optical cable includes a process of forming, for example, a coat with a diameter of 3.8 mm or less on plurality of optical fibers 1. The method for manufacturing an optical cable is carried out so that a core density obtained, for example, by dividing the number of optical fibers included in an optical cable by a cross-sectional area calculated from a diameter of the coat becomes 4.4 pieces/mm$^2$ or more. For example, the method for manufacturing an optical cable is carried out so that the number of optical fibers 1 included in the optical cable becomes 50 pieces or more. In the method for manufacturing an optical cable, since the optical cable includes optical fiber 1, it is possible to manufacture an optical cable capable of suppressing an increase in the micro-bending loss even in a high density.

Although the embodiments and the modification examples have been described above, the present disclosure is not limited to the above-described embodiments and modification examples, and various changes can be made without departing from the gist thereof. The above-described embodiment and modification example can be appropriately combined.

REFERENCE SIGNS LIST

1: optical fiber, 10: glass fiber, 11: core, 12: cladding, 20: coating resin, 21: primary resin layer, 22: secondary resin layer.

What is claimed is:

1. A method for manufacturing an optical fiber that includes a glass fiber with a diameter of 125 μm or less, a primary resin layer that surrounds the glass fiber, and a secondary resin layer that surrounds the primary resin layer and has a diameter of from 150 μm to 210 μm, and is used in an optical cable, wherein when a lateral rigidity is set as D0, a bending rigidity is set as H0, a transmission loss at a wavelength of 1.55 μm before being mounted in the optical cable is set as α1, and a transmission loss at a wavelength of 1.55 μm after being mounted in the optical cable is set as α2 with respect to a reference optical fiber, and when a diameter of the glass fiber is set as Dg [μm], a radius of the glass fiber is set as R0 [m], a Young's modulus of the glass fiber is set as E0 [N/m$^2$], a radius of the primary resin layer is set as R1 [m], a Young's modulus of the primary resin layer is set as E1 [N/m$^2$], a radius of the secondary resin layer is set as R2 [m], a Young's modulus of the secondary resin layer is set as E2 [N/m$^2$], a lateral rigidity of the optical fiber as shown in Formula (1) is set as D [N/m$^2$], and a bending rigidity of the optical fiber as shown in Formula (2) is set as H [N·m$^2$] with respect to the optical fiber, Formula (3) is satisfied, $$D = \left\{ \frac{c1}{\left(1 - \frac{R0}{R2}\right)^{c2}} + c3 \right\} \left\{ (E2 - E1) 10^{\sum_{i,j,k} c_{ijk} \left(\log_{10} \frac{R2-R1}{R2-R0}\right)^i \left(\log_{10} \frac{E1}{E2}\right)^j \left(\log_{10} \frac{R0}{R2}\right)^k} + E1 \right\} \tag{1}$$

$$H \propto \pi R0^4 E0 + \pi(R2^4 - R1^4)E2 \tag{2}$$

$$0.3 \geq \frac{D/H^2}{D0/H0^2}(\alpha 2 - \alpha 1) + \alpha 1 \tag{3}$$

in Formula (1), c1 is 0.209367, c2 is 1.206659, c3 is 0.401169, and $c_{ijk}$ is as follows.

$$c_{000} = -0.611554$$
$$c_{100} = 3.615414$$
$$c_{010} = 0.253128$$
$$c_{001} = -7.130445$$
$$c_{200} = 0.787599$$
$$c_{110} = 0.329243$$
$$c_{101} = 2.320080$$
$$c_{020} = -0.062024$$
$$c_{011} = -0.985974$$
$$c_{002} = -8.696048$$

2. The method for manufacturing an optical fiber according to claim 1, wherein Formula (3) and Formula (4) are satisfied.

$$0.18 \leq \frac{D/H^2}{D0/H0^2}(\alpha 2 - \alpha 1) + \alpha 1 \tag{4}$$

3. The method for manufacturing an optical fiber according to claim 1, wherein a diameter of the glass fiber is less than 125 μm.

4. The method for manufacturing an optical fiber according to claim 1, wherein a diameter of the glass fiber is 120 μm or less.

5. The method for manufacturing an optical fiber according to claim 1, wherein the Young's modulus of the glass fiber is from 70 GPa to 80 GPa.

6. A method for manufacturing an optical cable, comprising:

manufacturing an optical cable including a plurality of the optical fibers according to claim 1.

7. The method for manufacturing an optical cable according to claim 6, wherein the optical cable further includes a coat, and a diameter of the coat is 3.8 mm or less, and all of the optical fibers are surrounded by the coat.

8. The method for manufacturing an optical cable according to claim 7, wherein a core density obtained by dividing a number of the optical fibers included in the optical cable by a cross-sectional area calculated from the diameter of the coat is set to 4.4 pieces/mm$^2$ or more.

9. The method for manufacturing an optical cable according to claim 1, wherein the number of the optical fibers included in the optical cable is set to 50 or more.

10. An optical fiber that includes a glass fiber with a diameter of 125 μm or less, a primary resin layer that surrounds the glass fiber, and a secondary resin layer that surrounds the primary resin layer and has a diameter of from 150 μm to 210 μm, and is used in an optical cable, wherein when a lateral rigidity is set as D0, a bending rigidity is set as H0, a transmission loss at a wavelength of 1.55 μm before being mounted in the optical cable is set as α1, and a transmission loss at a wavelength of 1.55 μm after being mounted in the optical cable is set as α2 with respect to a reference optical fiber, and when a diameter of the glass fiber is set as Dg [μm], a radius of the glass fiber is set as R0 [m], a Young's modulus of the glass fiber is set as E0 [N/m$^2$], a radius of the primary resin layer is set as R1 [m], a Young's modulus of the primary resin layer is set as E1 [N/m$^2$], a radius of the secondary resin layer is set as R2 [m], a Young's modulus of the secondary resin layer is set as E2 [N/m$^2$], a lateral rigidity of the optical fiber as shown in Formula (1) is set as D [N/m$^2$], and a bending rigidity of the optical fiber as shown in Formula (2) is set as H [N·m$^2$] with respect to the optical fiber, Formula (3) is satisfied, $$D = \left\{ \frac{c1}{\left(1 - \frac{R0}{R2}\right)^{c2}} + c3 \right\} \left\{ (E2 - E1) 10^{\sum_{i,j,k} c_{ijk} \left(\log_{10} \frac{R2-R1}{R2-R0}\right)^i \left(\log_{10} \frac{E1}{E2}\right)^j \left(\log_{10} \frac{R0}{R2}\right)^k} + E1 \right\} \tag{1}$$

$$H \propto \pi R0^4 E0 + \pi(R2^4 - R1^4)E2 \tag{2}$$

$$0.3 \geq \frac{D/H^2}{D0/H0^2}(\alpha 2 - \alpha 1) + \alpha 1 \tag{3}$$

in Formula (1), c1 is 0.209367, c2 is 1.206659, c3 is 0.401169, and $c_{ijk}$ is as follows $$c_{000} = -0.611554$$
$$c_{100} = 3.615414$$
$$c_{010} = 0.253128$$
$$c_{001} = -7.130445$$

-continued $$c_{200} = 0.787599$$

$$c_{110} = 0.329243$$

$$c_{101} = 2.320080$$

$$c_{020} = -0.062024$$

$$c_{011} = -0.985974$$

$$c_{002} = -8.696048$$

* * * * *